United States Patent [19]
Kondou et al.

[11] Patent Number: 5,688,862
[45] Date of Patent: Nov. 18, 1997

[54] SEMICONDUCTIVE SILICONE ELASTOMER COMPOSITIONS AND METHOD FOR MAKING

[75] Inventors: Takashi Kondou; Takeo Yoshida; Hajime Saito, all of Gunma-ken, Japan

[73] Assignee: Shin-Etsu Chemical Co., Ltd., Tokyo, Japan

[21] Appl. No.: 541,707

[22] Filed: Oct. 10, 1995

[30] Foreign Application Priority Data

Oct. 11, 1994 [JP] Japan ................. 6-271721

[51] Int. Cl.[6] ................. C08K 3/08; H01B 1/06
[52] U.S. Cl. ................. 524/780; 524/783; 524/784; 524/785; 524/847; 524/862; 252/511; 252/512; 252/518; 252/519; 252/520
[58] Field of Search ................. 252/511, 512, 252/518, 519, 520; 524/862, 84, 588, 49, 847, 783, 784, 785, 780

[56] References Cited

U.S. PATENT DOCUMENTS

| | | | |
|---|---|---|---|
| 4,273,697 | 6/1981 | Sumimura et al. | 260/37 SB |
| 4,279,783 | 7/1981 | Kehrer et al. | 252/511 |
| 4,742,142 | 5/1988 | Shimizu et al. | 524/862 |
| 5,015,413 | 5/1991 | Nagaoka | 252/511 |
| 5,164,443 | 11/1992 | Watanabe | 524/495 |
| 5,183,594 | 2/1993 | Yoshinaka et al. | 252/518 |
| 5,229,037 | 7/1993 | Nakano et al. | 252/512 |
| 5,294,373 | 3/1994 | Takahashi et al. | 252/502 |
| 5,356,954 | 10/1994 | Adachi et al. | 523/200 |
| 5,384,075 | 1/1995 | Okami | 252/511 |
| 5,431,844 | 7/1995 | Nishiwaki | 252/511 |
| 5,447,791 | 9/1995 | Cunningham et al. | 428/327 |

Primary Examiner—Karen A. Dean
Attorney, Agent, or Firm—Millen, White, Zelano & Branigan, P.C.

[57] ABSTRACT

In a semiconductive silicone elastomer composition comprising an organopolysiloxane containing at least two aliphatic unsaturated hydrocarbon groups attached to a silicon atom, an organohydrogenpolysiloxane containing at least two hydrogen atoms attached to a silicon atom, and a conductive agent, the conductive agent consists of 1–10 wt % of conductive carbon and 99–90 wt % of a conductive filler having a volume resistivity of $10^1$–$10^8$ Ω-cm other than the conductive carbon. The conductive agent is blended in an amount of 20–60 wt % of the entire composition. The composition having the conductive agent uniformly dispersed therein yields a semiconductive silicone elastomer having a volume resistivity of $10^5$–$10^{10}$ Ω-cm with a dispersity of 1 to 10.

7 Claims, 1 Drawing Sheet

SEMICONDUCTIVE SILICONE ELASTOMER COMPOSITIONS AND METHOD FOR MAKING

BACKGROUND OF THE INVENTION

1. Field of the Invention

This invention relates to a semiconductive silicone elastomer composition of the heat curing type which cures through hydrosilylation reaction and more particularly, to a semiconductive silicone elastomer composition yielding a semiconductive silicone elastomer exhibiting consistent semiconductive property, typically a volume resistivity in the range of $10^5$ to $10^{10}$ $\Omega$-cm with a minimized dispersity. It also relates to a method for preparing the same.

2. Prior Art

Because of heat resistance, low-temperature resistance, weatherability and electrical insulation, silicone rubber is utilized in a variety of applications as electrically insulating rubber. The silicone rubber can be rendered electrically conductive by adding conductive agents thereto. Exemplary conductive agents include π electron transfer conductive substances such as carbon black, graphite powder, and carbon fibers, free electron transfer conductive substances such as powder or flake metals including silver, nickel, copper, zinc, iron, gold, and silicon, and oxides of such metals. Silicone elastomer compositions having conductive agents added thereto are used in a wide variety of applications as conductive silicone elastomer compositions.

However, there are currently available few semiconductive silicone elastomers having a volume resistivity in the semiconductive range, that is, of $10^5$ to $10^{10}$ $\Omega$-cm, with a minimized variation or dispersity. In theory, semiconductive silicone elastomers having a volume resistivity in the semiconductive range can be prepared by adjusting the amount of conductive carbon black added. In fact, however, there arise problems that the volume resistivity varies among lots and molding of silicone elastomer composition causes a change of volume resistivity.

Japanese Patent Application Kokai (JP-A) No. 156858/1988 discloses to blend in a silicone rubber composition crushed fragments of a crosslinked silicone rubber loaded with carbon black. Since the conductive silicone rubber fragments have a particle size as large as 0.3 mm, they are less dispersible when added to a liquid silicone elastomer composition. It is then difficult to obtain a silicone elastomer having a consistent volume resistivity.

SUMMARY OF THE INVENTION

Therefore, an object of the present invention is to provide a semiconductive silicone elastomer composition which yields a semiconductive silicone elastomer having a uniform distribution of conductive substance and a consistent volume resistivity. Another object is to provide a method for preparing the composition.

The present invention provides a semiconductive silicone elastomer composition comprising an organopolysiloxane containing at least two aliphatic unsaturated hydrocarbon groups each attached to a silicon atom in a molecule, an organohydrogenpolysiloxane containing at least two hydrogen atoms each attached to a silicon atom in a molecule, and a conductive agent. The conductive agent used herein consists essentially of 1 to 10% by weight of conductive carbon and 99 to 90% by weight of a conductive filler having a volume resistivity of $10^1$ to $10^8$ $\Omega$-cm other than the conductive carbon. The conductive agent is blended in an amount of 20 to 60% by weight of the entire composition. In one preferred embodiment wherein the composition further includes a non-conductive inorganic filler, the content of the conductive filler is 50 to 80% by weight of the total amount of the conductive agent and the non-conductive inorganic filler. The composition yields a semiconductive silicone elastomer having a volume resistivity of $10^5$ to $10^{10}$ $\Omega$-cm and a volume resistivity dispersity, which is expressed by a ratio of the maximum value to the minimum value of the volume resistivity of a silicone elastomer, of from 1 to 10.

In another aspect of the invention, a semiconductive silicone elastomer composition is prepared by kneading all or a part of an organopolysiloxane containing at least two aliphatic unsaturated hydrocarbon groups each attached to a silicon atom in a molecule with conductive carbon at a temperature of 100° to 200° C., cooling the kneaded mixture to room temperature (for example 0° to 40° C.), adding a conductive filler having a volume resistivity of $10^1$ to $10^8$ $\Omega$-cm other than the conductive carbon to the mixture, and mixing the resulting mixture again at a temperature of 0° to 60° C.

BEST MODE FOR CARRYING OUT THE INVENTION

Figure 1:
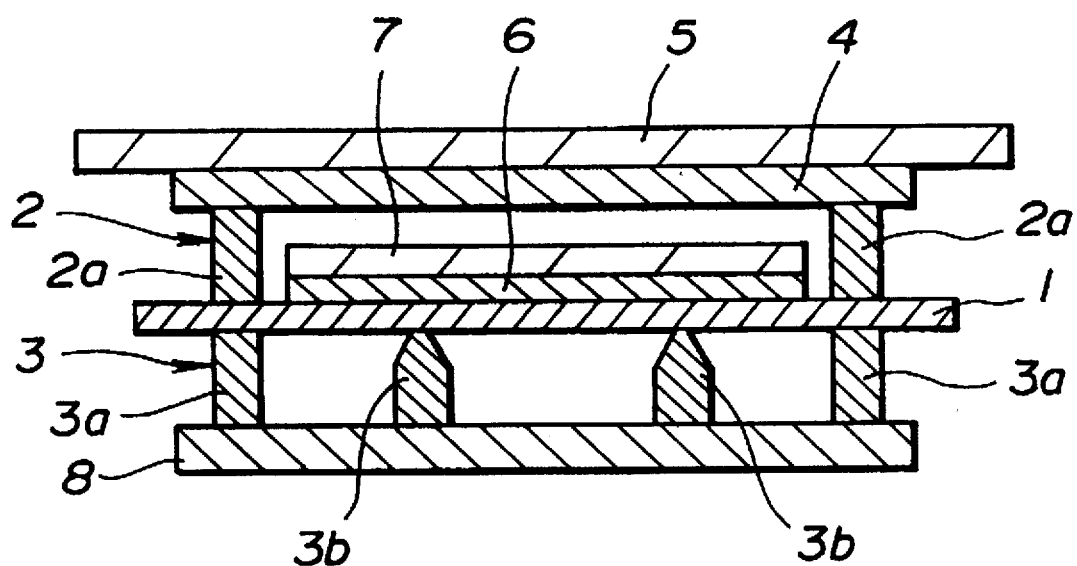
FIG. 1 is a sectional view for explaining a method of measuring a volume resistivity.

Briefly stated, the semiconductive silicone elastomer composition of the invention contains (A) an organopolysiloxane containing at least two aliphatic unsaturated hydrocarbon groups each attached to a silicon atom in a molecule, (B) an organohydrogenpolysiloxane containing at least two hydrogen atoms each attached to a silicon atom in a molecule, (C) conductive carbon, and (D) a conductive filler other than the conductive carbon having a volume resistivity of $10^1$ to $10^8$ $\Omega$-cm Component (A) is an organopolysiloxane containing at least two aliphatic unsaturated hydrocarbon groups each attached to a silicon atom in a molecule. It is a base component of the silicone elastomer composition of the invention. Preferably the organopolysiloxane has the average compositional formula:

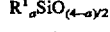

$$R^1{}_a SiO_{(4-a)/2}$$

wherein $R^1$ is a substituted or unsubstituted monovalent hydrocarbon group having 1 to 10 carbon atoms and letter a is a positive number of 1 to 3, preferably 1.9 to 2.1. At least two of $R^1$ groups are aliphatic unsaturated hydrocarbon groups. Typical of the unsaturated hydrocarbon group are alkenyl groups such as vinyl, allyl and isopropenyl. Examples of the organic group $R^1$ other than the unsaturated hydrocarbon group include alkyl groups such as methyl, ethyl, propyl, and butyl; aryl groups such as phenyl and tolyl; and substituted groups wherein some or all of the hydrogen atoms of these organic groups are replaced by halogen atoms or cyano groups, such as chloromethyl, trifluoropropyl and cyanoethyl.

The organopolysiloxane preferably has a straight chain structure although a partially branched or cyclic skeleton is acceptable. The organopolysiloxane preferably has a viscosity of about 20 to 200,000 centistokes (cs), especially about 100 to 100,000 cs at 25° C.

Component (B) is an organohydrogenpolysiloxane containing at least two hydrogen atoms each attached to a silicon atom (i.e. SiH group) in a molecule, which serves as a crosslinking agent for component (A) or organopolysiloxane. Other than the hydrogen atoms, the organohydrogenpolysiloxane has an organic group attached to a silicon atom and examples of the organic group are as exemplified for the organic group $R^1$, preferably other than aliphatic unsaturation, in component (A). Any of conventional well-known organohydrogenpolysiloxanes may be used.

The organohydrogenpolysiloxane generally has a straight chain structure although a branched, cyclic or three-dimentional network skeleton is acceptable. It preferably has a degree of polymerization or a number of Si atoms per molecule of 3 to 300.

Component (B) is blended in such amounts that the molar ratio of the hydrogen atom attached to a silicon atom in a molecule of component (B) to the aliphatic unsaturated hydrocarbon group attached to a silicon atom in component (A) may range from 10:1 to 1:10, preferably 3:1 to 1:3.

In the composition of the invention, a hydrosilylation catalyst is generally added in a catalytic amount. Platinum or platinum compounds, rhodium compounds and palladium compounds are exemplary catalysts. The platinum catalyst may be selected from well-known platinum and platinum compounds, for example, platinum black, chloroplatinic acid, alcohol-modified chloroplatinic acid, and complexes of chloroplatinic acid with olefins, aldehydes, vinyl siloxanes, and acetylene alcohols. The amount of the catalyst (including platinum, rhodium and palladium compounds) added is a catalytic amount and may be appropriately increased or decreased in accordance with a desired curing rate although the catalyst is typically added in amounts to provide 0.1 to 1,000 ppm, especially 1 to 500 ppm of elemental platinum, rhodium or palladium based on the weight of component (A).

A conductive agent is blended in the semiconductive silicone elastomer composition of the invention. According to the invention, the conductive agent includes (C) conductive carbon having a volume resistivity of less than $10^1$ $\Omega$-cm combined with (D) a conductive filler other than the conductive carbon.

With respect to the conductive carbon as component (C), its type is not critical. It may be selected from commonly used graphites and carbon blacks such as acetylene black, oil furnace black and anthracene black. They are used singly or in combination. Preferred are acetylene black and oil furnace black.

The conductive filler as component (D) is other than the conductive carbon and should have a volume resistivity of $10^1$ to $10^8$ $\Omega$-cm. Examples of the conductive filler include metal oxides such as conductive zinc oxide, titanium black, black iron oxide, tin oxide, and antimony oxide, metals such as germanium, and magnetite powder, with the metal oxides being preferred. They are used singly or in combination.

The conductive agent (conductive carbon and conductive filler) is blended in an amount of 20 to 60% by weight of the entire composition. Silicone elastomer compositions are insulating when they contain less than 20% by weight of the conductive agent and conductive when they contain more than 60% by weight of the conductive agent.

The conductive agent consists essentially of 1 to 10%, preferably 2 to 7% by weight of component (C) and 99 to 90%, preferably 98 to 93% by weight of component (D). Silicon elastomers become conductive if the proportion of component (D) is less than 90% and insulating if the proportion of component (D) is more than 99%. That is, the object of the invention is not achieved outside the range because semiconductive property as represented by a volume resistivity of $10^5$ to $10^{10}$ $\Omega$-cm is hardly available.

In one preferred embodiment, the composition further contains a non-conductive inorganic filler having a volume resistivity of more than $10^8$ $\Omega$-cm such as silica fine powder and calcium carbonate. In this embodiment, the content of conductive filler (D) should preferably be 50 to 80% by weight of the total amount of the conductive agent and the non-conductive inorganic filler. On this basis, less than 50% of component (D) would be insufficient for silicone elastomers to be semiconductive whereas more than 80% of component (D) would be detrimental to the reinforcement of silicone elastomers, which become lower in strength. Preferably, the non-conductive inorganic filler is blended in amounts of 0 to about 200 parts, more preferably about 5 to 100 parts, most preferably about 10 to 80 parts by weight per 100 parts by weight of component (A) or organopolysiloxane.

In the composition of the invention, there may be blended optional additives including hydrosilylation control agents such as nitrogenous compounds, acetylene compounds, phosphorus compounds, nitrile compounds, carboxylates, tin compounds, mercury compounds, and sulfur compounds; heat resistance modifiers such as iron oxide and cerium oxide; tackifiers; and thixotropic agents.

The semiconductive silicone elastomer composition of the invention is prepared by first mixing a part or all of organopolysiloxane (A) with conductive carbon (C), heating the mixture to 100° to 200° C., and kneading the mixture. The kneading time is about 1 to 5 hours. At the end of kneading, the mixture is cooled down to room temperature (for example, 0° to 40° C., usually 5° to 30° C.). Conductive filler (D) is then added to the mixture, which is kneaded at 0° to 50° C. for about 1 to 5 hours, obtaining a base compound. The remainder of organopolysiloxane (A), if any, organohydrogenpolysiloxane (B) and a hydrosilylation catalyst are added to the base compound, obtaining a semiconductive silicone elastomer composition.

The blending of components (C) and (D), conductive carbon and other conductive filler is described in detail. If components (C) and (D) are concurrently added to a part or all of component (A) and heat treated at 100° to 200° C., there results a silicone elastomer having a volume resistivity in the insulating range, i.e., of more than $10^{10}$ $\Omega$-cm; if heat treatment is omitted, there results a silicone elastomer having a volume resistivity in the conductive range, i.e., of less than $10^5$ $\Omega$-cm. In either case, it is difficult to stabilize the dispersity of volume resistivity. In contrast, if either one of components (C) and (D) is kneaded with part or all of component (A) and heat treated at 100° to 200° C., there results a semiconductive silicone elastomer having a volume resistivity of $10^5$ to $10^{10}$ $\Omega$-cm. Especially by kneading component (C) with a part or all of component (A) while heat treating the mixture, the dispersity or variation of volume resistivity can be reduced to such as 1 to 10, usually 2 to 5, that is, the silicone elastomer can have a consistent volume resistivity. This is the reason why the above-mentioned process is recommended. The term "dispersity of volume resistivity" used herein designates a proportion of maximum measurements relative to minimum measurements of volume resistivity of a cured silicone elastomer. Measurement is done on a cured silicone elastomer at 10 or more different points or on 10 or more silicone elastomer samples of the same composition which have been cured under the same conditions.

In the first step of kneading component (C) with a part of component (A), this part is preferably about 10 to 90% by weight of component (A). Where a non-conductive inorganic filler is contained, it may be blended concurrent with either component (C) or (D).

For curing of the semiconductive silicone elastomer composition, primary vulcanization such as press molding by heating at 60° to 200° C. for about 1 to 20 minutes is sufficient and optionally followed by secondary vulcanization by heating at 150° to 250° C. for about 2 to 7 hours.

The thus obtained silicone elastomer is a semiconductor having a volume resistivity of $10^5$ to $10^{10}$ Ω-cm, within which range the dispersity of volume resistivity is as narrow as 1 to 10. That is, the volume resistivity is fully consistent. The silicone elastomer is thus suitable as paper feed rollers, transfer rollers, developing rollers and fixing rollers for plain paper copiers, printers and facsimile machines.

EXAMPLE

Examples of the present invention are given below by way of illustration and not by way of limitation.

In the following Examples, volume resistivity was measured by the following method according to the Standard of the Japanese Rubber Society SRIS 2301-1969. Rubber hardness (using JIS A scale hardness meter), specific gravity, tensile strength, elongation, and compression set were measured according to JIS K-6301.
Measurement of volume resistivity A test assembly is shown in FIG. 1. A test specimen 1 of 150 mm long, 20 mm wide, and 0.5 to 1.0 mm thick was sandwiched between upper and lower electrodes 2 and 3. The upper electrode 2 included a pair of current terminals 2a, 2a of 30 mm long, 15 mm wide, and 5 mm thick, on which an insulator plate 4 of polyethylene was rested. A weight 5 was rested on the insulator plate 4 so that a load of 5 kg was applied onto the current terminals 2a, 2a. The lower electrode 3 included a pair of current terminals 3a, 3a of 30 mm long, 15 mm wide, and 5 mm thick and another pair of pointed-head voltage terminals 3b, 3b of 30 mm long and 5 mm wide, which were rested on an insulating support 8. The current terminals 2a, 2a of the upper electrode 2 were vertically aligned with the current terminals 3a, 3a of the lower electrode 3, respectively. another weight 7 of 0.5 kg was rested on the test specimen 1 via another insulator plate 6. Electricity was applied across the upper and lower electrodes 2 and 3 to measure the volume resistivity of the test specimen 1.

Example 1

1.2 g of carbon black (Ketjen Black EC-600JD by Lion Akzo K. K.), 60 g of a linear dimethylpolysiloxane end-blocked by trimethylsilyl groups at both molecular ends thereof and having $(CH_2=CH)(CH_3)SiO_{2/2}$ units in a molecular chain, a viscosity of 10,000 cs and a vinyl equivalent of 0.0094 mol/100 g, and 30 g of crystalline silica were kneaded at 150° C. for 2 hours. The mixture was cooled down to 25° C. and mixed with 60 g of conductive zinc oxide having a volume resistivity of 60 Ω-cm under a pressure of 570 kg/cm². The mixture was milled by a three-roll mill at 25° C. to uniformly disperse the components, obtaining a base compound A.

In base compound A, the materials shown in Table 1 were blended in the amounts shown in Table 1. The blend was press vulcanized at 120° C. and 100 kg/cm² for 10 minutes and then secondary vulcanized at 200° C. for 4 hours, obtaining ten sheets of silicone elastomer. The each sheets were measured for volume resistivity. The results are shown in Table 1.

Example 2

By following the same procedure as in Example 1 except that titanium black having a volume resistivity of 90 Ω-cm under a pressure of 570 kg/cm² was used instead of the conductive zinc oxide, there were prepared a base compound B and ten sheets of silicone elastomer. The each sheets were measured for volume resistivity. The results are also shown in Table 1.

Comparative Example 1

2.5 g of carbon black, 60 g of a linear dimethylpolysiloxane end-blocked by trimethylsilyl groups at both molecular ends thereof and having $(CH_2=CH)(CH_3)SiO_{2/2}$ units in a molecular chain, a viscosity of 10,000 cs and a vinyl equivalent of 0.0094 mol/100 g, and 90 g of crystalline silica were kneaded at 150° C. for 2 hours and milled by a three-roll mill at 25° C. to uniformly disperse the components, obtaining a base compound C.

In base compound C, the materials shown in Table 1 were blended in the amounts shown in Table 1. The blend was vulcanized as in Example 1, obtaining ten sheets of silicone elastomer. The each sheets were measured for volume resistivity. The results are also shown in Table 1.

Comparative Example 2

The components of base compound A in Example 1 were mixed together and kneaded at the elevated temperature of 150° C. for 2 hours as in Example 1, obtaining a base compound. D. Ten sheets of silicone elastomer were prepared from base compound D as in Example 1 and measured for volume resistivity. The results are also shown in Table 1.

Comparative Example 3

The components of base compound A in Example 1 were mixed together and kneaded at 25° C. without heating, obtaining a base compound E. A sheet was prepared from base compound E as in Example 1 and measured for volume resistivity. The results are also shown in Table 1.

TABLE 1

|  | Example | | Comparative Example | | |
|---|---|---|---|---|---|
|  | 1 | 2 | 1 | 2 | 3 |
| Base compound | | | | | |
| Type | A | B | C | D | E |
| Amount (g) | 151.2 | 151.2 | 151.2 | 151.2 | 151.2 |
| Vinylpolysiloxane* (g) | 120 | 120 | 120 | 120 | 120 |
| H-polysiloxane** (g) | 4.6 | 4.6 | 4.6 | 4.6 | 4.6 |
| Pt catalyst (g) | 0.5 | 0.5 | 0.5 | 0.5 | 0.5 |
| Volume resistivity (Ω-cm) minimum | $8 \times 10^7$– | $2 \times 10^9$– | $3 \times 10^4$– | $7 \times 10^{13}$– | $6 \times 10^4$– |
| maximum | $4 \times 10^8$ | $7 \times 10^9$ | $5 \times 10^8$ | $2 \times 10^{14}$ | $5 \times 10^7$ |
| Volume resistivity disparsity | 5.0 | 3.5 | 17000 | 2.9 | 830 |
| Hardness (JIS A) | 20 | 19 | 20 | 21 | 18 |
| Specific gravity | 1.30 | 1.31 | 1.28 | 1.30 | 1.30 |
| Tensile strength (kgf/cm²) | 14 | 15 | 13 | 15 | 10 |
| Elongation (%) | 300 | 280 | 250 | 320 | 340 |
| Compression set (%) (180° C./22 hours) | 9 | 8 | 10 | 8 | 15 |

*dimehylpolysiloxane containing vinyl groups at both ends (viscosity 100,000 cs, vinyl equivalent 0.0023 mol/100 g)
**methylhydrogenpolysiloxane containing Si-H groups at both ends and side chains (SiH equivalent 0.00308 mol/g)

There has been described a semiconductive silicone elastomer composition which yields a silicone elastomer having conductive materials uniformly dispersed therein and hence, exhibiting a volume resistivity in the semiconductive range with a minimized dispersity.

Japanese Patent Application No. 271721/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A semiconductive silicone elastomer composition comprising
   (a) a liquid organopolysiloxane containing at least two aliphatic unsaturated hydrocarbon groups each attached to a silicon atom in a molecule,
   (b) a liquid organohydrogenpolysiloxane containing at least two hydrogen atoms each attached to a silicon atom in a molecule, and
   (c) a conductive agent consisting essentially of 1 to 10% by weight of conductive carbon and 99 to 90% by weight of a conductive filler other than conductive carbon having a volume resistivity of $10^1$ to $10^8$ $\Omega$-cm, said conductive agent being blended in an amount of 20 to 60% by weight of the entire composition,
   said composition yielding a semiconductive silicone elastomer having a volume resistivity of $10^5$ to $10^{10}$ $\Omega$-cm with a dispersity of from 1 to 10.

2. The composition of claim 1 further comprising a non-conductive inorganic filler in an amount such that the content of said conductive filler is 50 to 80% by weight of the total amount of said conductive agent and said non-conductive inorganic filler.

3. The composition of claim 1 wherein the conductive filler other than the conductive carbon is at least one selected from the group consisting of conductive zinc oxide, titanium black, black iron oxide, tin oxide, antimony oxide, germanium and magnetite.

4. A method for preparing a semiconductive silicone elastomer composition comprising the steps of:
   (a) kneading all or a part of an organopolysiloxane containing at least two aliphatic unsaturated hydrocarbon groups each attached to a silicon atom in a molecule with conductive carbon at a temperature of 100° to 200° C.,
   (b) cooling the kneaded mixture to room temperature,
   (c) adding a conductive filler other than conductive carbon having a volume resistivity of $10^1$ to $10^8$ $\Omega$-cm to the mixture, and
   (d) mixing the resulting mixture again at a temperature of 0° to 60° C.,
   wherein the amount of conductive carbon is from 1–10 wt. % and the amount of conductive filler other than carbon is from 99–90 wt. %, each based on the total weight of conductive carbon and conductive filler other than carbon.

5. The method of claim 4 wherein the conductive filler other than the conductive carbon is at least one selected from the group consisting of conductive zinc oxide, titanium black, black iron oxide, tin oxide, antimony oxide, germanium and magnetite.

6. A semiconductive silicone elastomer composition comprising:
   (a) an organopolysiloxane containing at least two aliphatic unsaturated hydrocarbon groups each attached to a silicon atom in a molecule, having a viscosity of about 20–200,000 cs at 25° C.,
   (b) an organohydrogenpolysiloxane containing at least two hydrogen atoms each attached to a silicon atom in a molecule, having a degree of polymerization of 3 to 300, and
   (c) a conductive agent consisting essentially of 1 to 10% by weight of conductive carbon and 99 to 90% by weight of a conductive filler other than conductive carbon having a volume resistivity of $10^1$ to $10^8$ $\Omega$-cm, said conductive agent being blended in an amount of 20 to 60% by weight of the entire composition,
   said composition yielding a semiconductive silicone elastomer having a volume resistivity of $10^5$ to $10^{10}$ $\Omega$-cm with a dispersity of from 1 to 10.

7. A semiconductive silicone elastomer as in claim 2, wherein the non-conductive inorganic filler has a volume resistivity of more than $10^8$ $\Omega$-cm.

* * * * *